(12) United States Patent
Kosanke

(10) Patent No.: US 8,746,183 B2
(45) Date of Patent: Jun. 10, 2014

(54) POULTRY HARNESS DIAPER

(75) Inventor: Tobi Kosanke, Hempstead, TX (US)

(73) Assignee: Crazy K Farm Pet and Poultry Products, LLC, Hempstead, TX (US)

( * ) Notice: Subject to any disclaimer, the term of this patent is extended or adjusted under 35 U.S.C. 154(b) by 182 days.

(21) Appl. No.: 13/207,708

(22) Filed: Aug. 11, 2011

(65) Prior Publication Data

US 2012/0037094 A1    Feb. 16, 2012

Related U.S. Application Data

(60) Provisional application No. 61/372,568, filed on Aug. 11, 2010.

(51) Int. Cl.
*A01K 23/00* (2006.01)
(52) U.S. Cl.
USPC ............................................ 119/868; 119/867
(58) Field of Classification Search
USPC .................................................. 119/867–869
See application file for complete search history.

(56) References Cited

U.S. PATENT DOCUMENTS

| | | | | |
|---|---|---|---|---|
| 2,691,983 A * | 10/1954 | Bernard | ..................... | 604/397 |
| 2,882,858 A * | 4/1959 | Dlugi | ..................... | 119/853 |
| 3,783,834 A | 1/1974 | Story | | |
| 4,149,687 A * | 4/1979 | Nunemacher | ............... | 224/159 |
| 5,934,226 A * | 8/1999 | Moore et al. | ............... | 119/868 |
| 6,368,313 B1 * | 4/2002 | Howard | ................. | 604/385.09 |
| 6,557,497 B1 * | 5/2003 | Milligan | ..................... | 119/850 |
| D476,781 S * | 7/2003 | Diamond | ..................... | D30/145 |
| 6,935,278 B2 * | 8/2005 | Brewington | ............... | 119/869 |
| 8,302,565 B2 * | 11/2012 | Williams | ..................... | 119/868 |

* cited by examiner

*Primary Examiner* — Kristen C Hayes
(74) *Attorney, Agent, or Firm* — Mayback & Hoffman, P.A.; Gregory L. Mayback; Thomas Bethea

(57) ABSTRACT

A diaper assembly for use on a bird includes an upper-body portion that has at least one first part of at least one couple assembly attached thereto. The diaper assembly also includes at least one shoulder strap with a first end coupled to the upper-body portion and a second end opposite the first end and a waste receiver that has a waste-catching pouch at least partially defined by a front-facing portion coupled to the second end of the at least one shoulder strap and a rear-facing portion having at least one second part of the at least one couple assembly. Each second part of the at least one couple assembly is operable to releasably secure at least the rear-facing portion of the waste receiver to the upper-body portion.

14 Claims, 3 Drawing Sheets

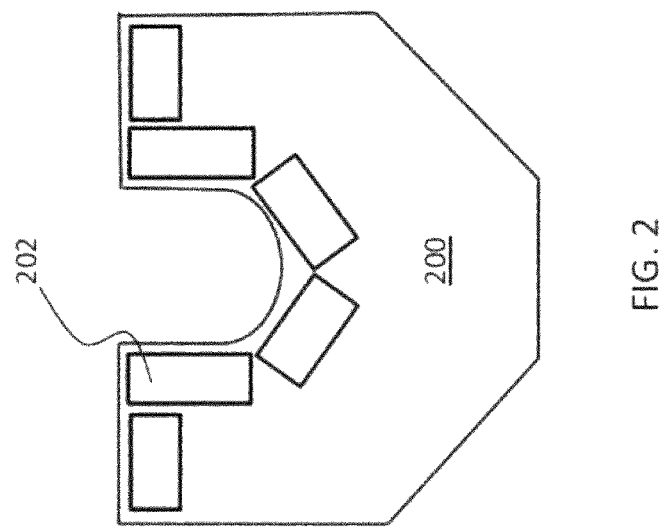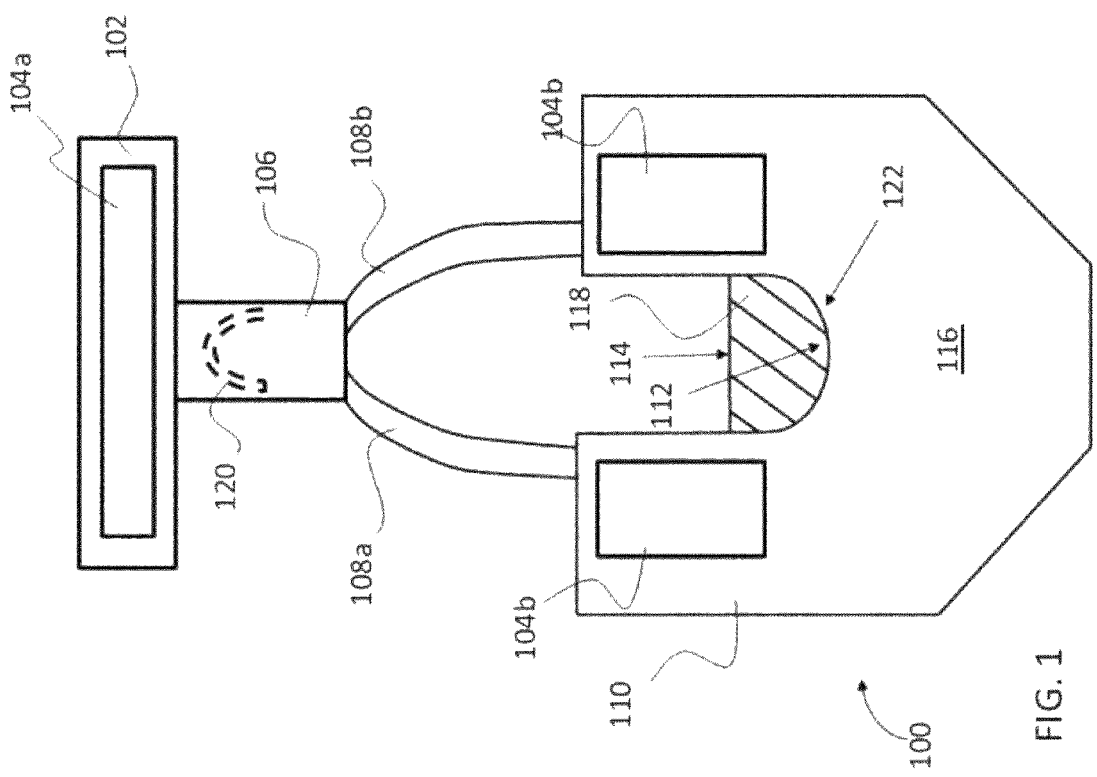

US 8,746,183 B2

POULTRY HARNESS DIAPER

CROSS-REFERENCE TO RELATED APPLICATIONS

This application is claims the priority, under 35 U.S.C. §119, of U.S. Provisional Patent Application Ser. No. 61/372,568, filed Aug. 11, 2010, the entire disclosures of which is hereby incorporated herein by reference in its entirety.

STATEMENT REGARDING FEDERALLY SPONSORED RESEARCH OR DEVELOPMENT

Not Applicable

FIELD OF THE INVENTION

The present invention relates generally to the sanitization and control of poultry, and, more particularly, relates to a harness/diaper combination device adapted for use on poultry and able to contain droppings in a way that does not soil the bird or its environment.

BACKGROUND OF THE INVENTION

Birds, such as chickens, ducks, geese, guinea fowl, turkeys and others, like many other animals, drop their bodily waste onto the ground beneath them. This waste is messy, sometimes has a foul odor, and contains bacteria. When a large number of birds are in a confined area and, especially, when birds are in an area that is shared by humans, dropping waste onto the ground is repugnant.

Several attempts have been made to attach a diaper-like structure to a bird. However, the prior-art attempts at bird diapers have failed to consider and accommodate a bird's natural desire to rest against a perch while perching or to lie with their stomachs touching the ground. If a bird were to do such activities with currently-known diaper devices, the bird would compress the captured waste against the bird's body.

In addition, many people enjoy birds as pets. These bird owners desire to not only have the bird's company at home, but in other locations as well. To help achieve these two goals, there exists several known leash devices that allow a pet owner to move about while keeping the bird tethered to them. These devices share many similarities with well-known dog leashes. However, there are no known devices that are comfortable to the bird.

Therefore, a need exists to overcome the problems with the prior art as discussed above.

SUMMARY OF THE INVENTION

Briefly, in accordance with the present invention, disclosed is a diaper assembly for use on a bird. The assembly includes an upper-body portion having at least one first part of at least one couple assembly attached thereto. At least one shoulder strap has a first end coupled to the upper-body portion and a second end opposite the first end. The assembly further includes a waste receiver having a waste-catching pouch at least partially defined by: a front-facing portion coupled to the second end of the at least one shoulder strap; and a rear-facing portion having at least one second part of the at least one couple assembly. Each second part of the at least one couple assembly is operable to releasably secure at least the rear-facing portion of the waste receiver to the upper-body portion.

In accordance with another feature of the invention, the upper-body portion has a harness-securing portion.

In accordance with a further feature of the present invention, there is provided a leash-attachment anchor coupled to the upper-body portion.

In accordance with yet another feature of the present invention, the waste receiver further includes a protective liner at least partially within and removably coupled to the waste-catching pouch.

In accordance with an additional feature of the present invention, the at least one couple assembly is at least one of: a hook and loop fastener; a snap fastener; a zipper; and a button and hole fastener.

In accordance with a further feature of the present invention, the at least one shoulder strap has a length and comprises a length of material having an elastic property along at least a portion of the length.

In accordance with another feature of the present invention, the at least one shoulder strap includes a sleeve of cloth material covering the length of material.

In accordance with an additional feature of the present invention, the at least one couple assembly includes at least one two-part couple, which includes the at least one first part of the upper-body portion and the at least one second part of the waste receiver.

In accordance with another feature of the invention, the upper-body portion includes at least one third part of the at least one couple assembly.

In accordance with an even further feature of the present invention, the at least one couple assembly includes a pair of three-part couples. Each three-part couple includes one of the at least one first part of the upper-body portion, one of the at least one second part of the waste receiver, and one of the at least one third part of the upper-body portion.

In accordance with yet another feature of the present invention, each second part includes a body member having an aperture operable to receive therethrough each third part. Each third part is operable to attach to one of the first parts after being received through the aperture of the second part to releasably secure the rear-facing portion of the waste receiver to the upper-body portion.

In accordance with an additional feature of the present invention, the upper-body portion includes an elastic middle portion disposed between the first and third parts of the at least one couple assembly.

In accordance with again another feature of the present invention, the waste receiver includes a notch formed in the rear-facing portion of the waste receiver.

With the objects of the invention in view, there is also provided a diaper assembly for a bird. The assembly includes an upper-body portion having at least one first part of a couple assembly attached thereto, at least one shoulder strap having a first end coupled to the upper-body portion and a second end opposite the first end, and a waste receiver having a front-facing portion coupled to the second end of the at least one shoulder strap, a rear-facing portion having at least one second part of the couple assembly, the at least one second part being operable to releasably secure at least the rear-facing portion to the upper-body portion, and a waste-catching pouch at least partially defined by the front-facing portion and the rear-facing portion.

With the objects of the invention in view, there is also provided a method for diapering a bird. The method includes providing a diaper assembly with an upper-body portion having at least one first part of at least one couple assembly attached thereto. The diaper assembly includes a pair of shoulder straps each having a first end coupled to the upper-body portion and each having a second end opposite the first end. The diaper assembly further includes a waste receiver having a waste-catching pouch at least partially defined by a front-facing portion coupled to the second end of each of the shoulder straps, and a rear-facing portion having at least one second part of the at least one couple assembly. The at least one second part of the at least one couple assembly is operable to releasably secure at least the rear-facing portion of the waste receiver to the upper-body portion. The method further includes the steps of placing a head of a bird between the pair of shoulder straps; placing the upper-body portion upon a back of the bird; placing the waste receiver under a waste vent of the bird; and removably coupling the waste receiver to the upper-body portion.

In accordance with a further mode of the invention, the waste receiver includes a notch formed in the rear-facing portion. The step of placing the waste receiver under a waste vent of the bird includes receiving tail feathers of the bird within the notch.

In accordance with another mode of the invention, the step of removably coupling the waste receiver to the upper-body portion includes coupling the at least one first part to the at least one second part of the at least one couple assembly.

In accordance with an additional mode of the invention, the upper body portion of the diaper assembly includes at least one third part of the at least one couple assembly. The at least one couple assembly includes a pair of three-part couples and each three-part couple has one of the at least one first part of the upper-body portion; one of the at least one second part of the waste receiver; and one of the at least one third part of the upper-body portion.

In accordance with yet another mode of the invention, each second part includes a body member having an aperture. The step of removably coupling the waste receiver to the upper-body portion includes receiving the third part of each three-part couple through the aperture of the second part of each three-part couple and attaching the third part of each three-part couple to the first part of each three-part couple.

In accordance with again another mode of the invention, the method further includes the step of attaching a leash to a portion of the diaper assembly.

In accordance with still an added mode of the invention, the method further includes the steps of coupling a leash-attachment anchor to the upper-body portion; and attaching a leash to leash-attachment anchor.

Although the invention is illustrated and described herein as embodied in a harness/diaper for use on poultry, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention. Other features that are considered as characteristic for the invention are set forth in the appended claims.

BRIEF DESCRIPTION OF THE DRAWINGS

The accompanying figures, where like reference numerals refer to identical or functionally similar elements throughout the separate views and which, together with the detailed description below, are incorporated in and form part of the specification, serve to further illustrate various embodiments and to explain various principles and advantages all in accordance with the present invention.

FIG. 1 is a plan view of a harness-diaper assembly in accordance with an exemplary embodiment of the present invention in an open, laid-flat configuration;

FIG. 2 is an elevational view of a protective insert for the exemplary harness-diaper assembly of FIG. 1;

DETAILED DESCRIPTION OF THE INVENTION

Figure 4:
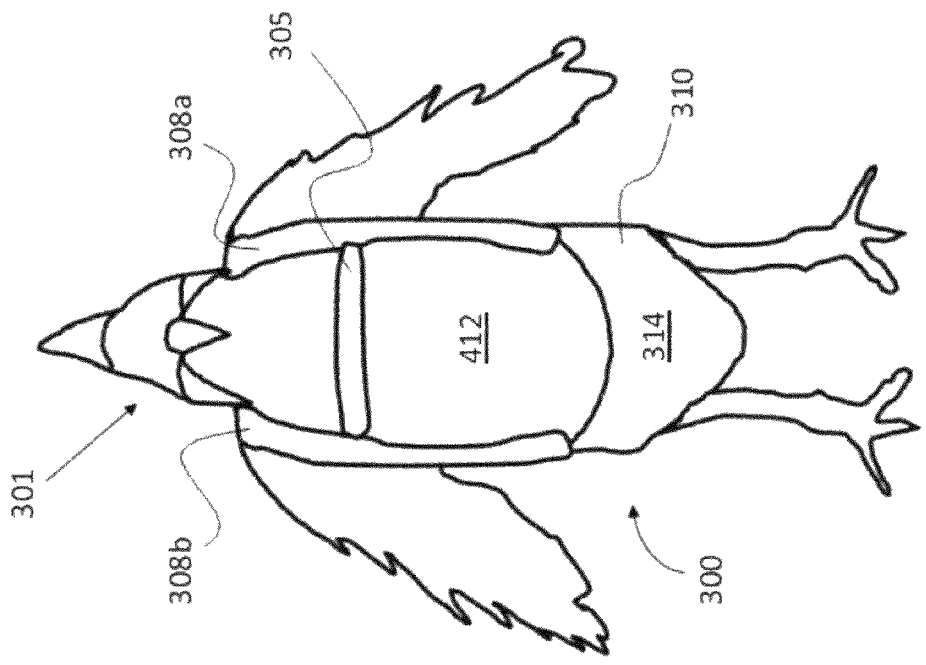
FIG. 4 is a bottom perspective view of the bird and harness-diaper assembly of FIG. 3.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "poultry" applies to all birds and not just chickens, ducks, geese, guinea fowl, and turkeys.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments of the present invention. Referring now to the figures of the drawings in detail and first, particularly to FIG. 1, there is shown a first exemplary embodiment of a harness-diaper assembly 100. As will be described below, the harness-diaper assembly 100 can be provided in several shapes, sizes, combinations of features and components, and varying numbers and functions of the components. As shown in FIG. 1, an exemplary harness-diaper assembly 100 is shown in a flattened state and is ready to be attached to a bird. The exemplary harness-diaper assembly 100 includes an upper-body portion 102 that, when the harness-diaper assembly 100 is worn by a bird, rests on the bird's back near its tail feathers. As shown in FIG. 1, a first part 104*a* of a couple assembly, which, in this exemplary embodiment, is a two-part releasable couple 104*a*, 104*b*, can be attached to and removed from the upper-body portion 102. The two-part couple 104*a*, 104*b* provides a mechanism for releasably coupling the upper-body portion 102 to other portions of the harness-diaper assembly 100. This coupling will be described below.

Although not necessary, the particular embodiment of the harness-diaper assembly 100 shown in FIG. 1 includes a harness-securing portion 106 that is attached to or is part of the upper-body portion 102. The harness-securing portion 106 includes a leash-attachment anchor 120 on its opposite side in the view of FIG. 1, which anchor 120 provides a mechanical coupling point for a leash or other tethering device to be attached to the harness-diaper assembly 100. Through use of the leash-attachment anchor 120 and a separately provided leash, a caretaker can ensure that the bird wearing the harness-diaper assembly 100 remains a predefined distance from the user or within an area of an object to which the leash is secured. The leash-attachment anchor 120 can be a metal loop, a fabric loop, a D-ring (i.e., a metal ring shaped like the letter D), a thread, an elastic, a hook and loop, or any other sufficiently resilient material for releasably attaching a leash to the harness-diaper assembly 100.

A pair of straps 108*a*, 108*b* is attached to the harness-securing portion 106 by an end of each individual strap 108*a*, 108*b*. In accordance with one exemplary embodiment of the present invention, the straps 108*a*, 108*b* are elastic, stretchable straps that can enlarge when securing the harness-diaper assembly 100 to a bird. So that the straps 108*a*, 108*b* are more comfortable to the bird, the straps 108*a*, 108*b* can be sleeved in any kind of material, such as cloth.

At their opposite end, the straps 108*a*, 108*b* are attached to a waste receiver portion 110. Because the view of FIG. 1 is elevational, the three-dimensional bowl-shape of the waste receiver portion cannot be seen. When the harness-diaper assembly 100 is worn by a bird, it is the waste receiver portion 110 of the harness-diaper assembly 100 that provides a collector for collecting waste as it is excreted. More specifically, the waste receiver portion 110 defines therein a waste-catching pouch 112. The bowl-shape of the waste-catching pouch 112 is at least partially formed by a front-facing portion 114 and a rear-facing portion 116 of the waste receiver portion 110, the front-facing portion 114 being behind the rear-facing portion in the view of FIG. 1. Although the front-facing portion 114 is mostly obscured by the rear-facing portion 116 in the view of FIG. 1, a portion of an interior surface 118 of the front-facing portion 114 is visible through a notch 122. When worn by a bird, the notch 122 provides a comfortable, snug, leak-proof fit around the bird's tail feathers. In addition, a pair of sidewalls (not visible in the view of FIG. 1) connects the front-facing portion 114 to the rear-facing portion 116 to form the bowl shape.

The rear-facing portion 116 has coupled thereto at least one second part 104*b* of the two-part couple 104*a*, 104*b*. In the exemplary embodiment of FIG. 1, two second parts 104*b* are shown. Each second part 104*b* of the two-part couple 104*a*, 104*b* is able to releasably secure the rear-facing portion 116 of the waste receiver portion 110 to the upper-body portion 102. In the particular embodiment shown in FIG. 1, the two-part couple 104*a*, 104*b* includes a hook and loop fastener, but the invention is in no way limited to this particular type of a couple. In other embodiments, the upper-body portion 102 is operable to couple to the waste receiver portion 110, for example, with snap fasteners, a zipper or zippers, a button-and-hole fastener or fasteners, or any other similar fastener known or contemplated by one of ordinary skill in the art.

The present harness-diaper assembly 100, or portions thereof, can be made of various materials, such as, but not limited to, cotton, denim, canvas duck, leather, nylon, and other suitable materials known or contemplated by one of ordinary skill in the art.

In accordance with exemplary embodiments of the present invention, a removable protective liner 200, shown in FIG. 2, is provided within the waste-catching pouch 112 and covers all or a portion of the interior surface 118 of the pouch 112. In an exemplary embodiment, the liner 200 is of a waterproof material that will prevent moisture from the bird's waste from seeping into the waste-catching pouch 112 of the harness-diaper assembly 100. Exemplary liner materials include, but are not limited to, plastic, vinyl, and duck cloth. FIG. 2 also illustrates one part 202 of a two-part releasable fastener that can be used to secure the liner 200 within the waste-catching pouch 112. The two-part releasable fastener can include, but is not limited to, hook and loop fasteners, snaps, buttons, hooks, zippers, and more.

Figure 3:
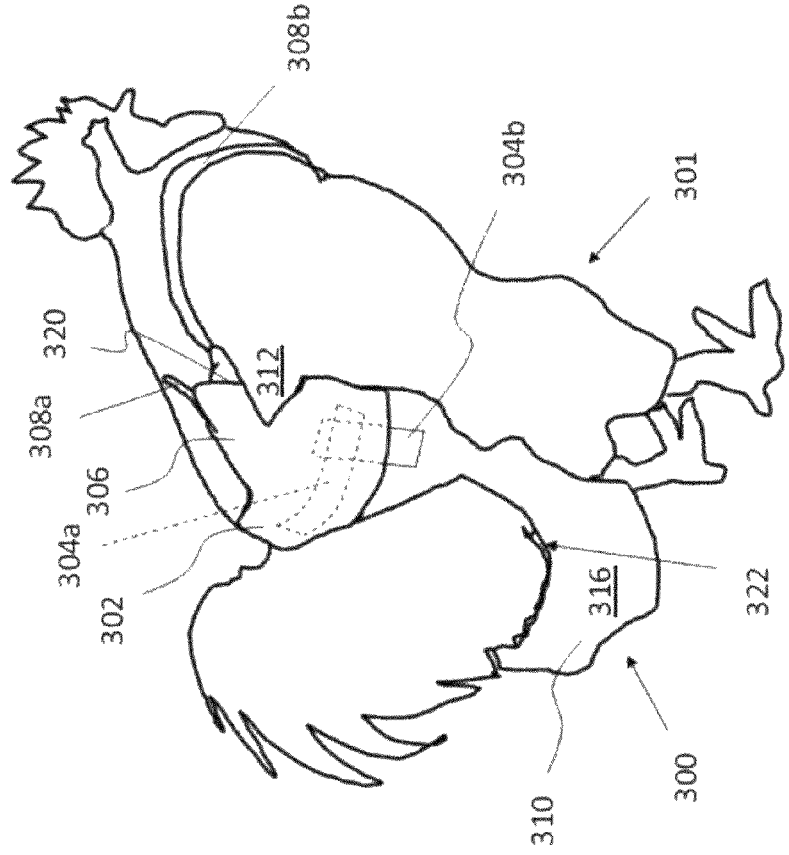
FIG. 3 is a rear-side perspective view of a bird with a harness-diaper assembly in accordance with another exemplary embodiment of the present invention attached thereto.

FIGS. 3 and 4 show a harness-diaper assembly 300, in accordance with another exemplary embodiment of the present invention, being worn by a bird, in this case, a chicken 301. The harness-diaper assembly 300 is similar to the harness-diaper assembly 100 of FIG. 1, wherein similar reference numbers increased by 200 refer to similar parts. When attached to a bird 301, the harness-securing portion 306 of the harness-diaper assembly 300 rests on top of the main portion of the bird's back 312. At the front-facing end of the harness-securing portion 306 are the straps 308*a*, 308*b*, which can be removably secured to the harness-securing portion 306 by snaps, buttons, hook and loop fasteners, sewing, and others. Attached to the rear-facing end of the harness-securing portion 306 is the upper-body portion 302. When being worn by a bird 301, the two-part couple 304*a*, 304*b* secures the upper-body portion 302 to the waste receiver portion 310. As can be seen in FIG. 3, the waste receiver portion 310 is positioned directly below the birds vent, i.e., behind the bird's legs and under the tail feathers. As the drawing herein shows, the waste receiver portion 310 is shaped to efficiently channel excrement away from the bird's body, even when the bird 301 is sitting or lying down. The bird's legs prevent the waste receiver portion 310 from moving forward and the straps 308a, 308b prevent the waste receiver portion 310 from moving backwards. Thus, the harness-diaper assembly 300 remains securely in place. In FIG. 3, the wings of the bird are not illustrated for clarity.

As best illustrated in FIG. 4, the straps 308a, 308b fit comfortably over/around the bird's shoulders, i.e., where the wing joints attach to the body, and do not interfere with the bird's ability to fly or perform other natural activities. As shown, the exemplary harness-diaper assembly 300 includes a stability strap 305 disposed between and connected to each of the straps 308a, 308b to provide a more secure fit when the harness-diaper assembly 300 is attached to a bird 301. The straps 308a, 308b and the stability strap 305 may be pre-sized according to specific bird dimensions, or they may elastic, stretchable straps operable to adjust to varying bird dimensions. Advantageously, the harness-diaper assembly 300 is attached to the bird 301 in a way that is completely secured to but still comfortable for the bird. In addition, because the inventive harness-diaper 300 does not place material under the bird's stomach, the bird 301 is able to comfortably lie down on the ground, or rest its stomach 412 on a perch. This is not possible with the prior-art bird diapers.

Figure 6:
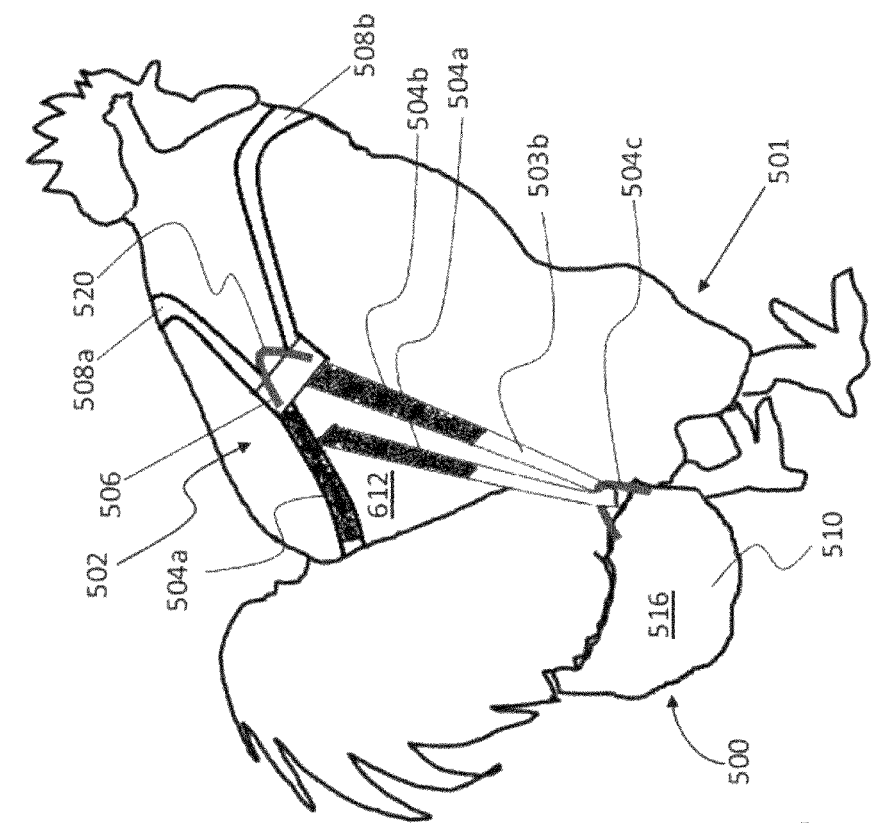
FIG. 6 is a rear-side perspective view of a bird with the harness-diaper assembly of FIG. 5 attached thereto.
Figure 5:
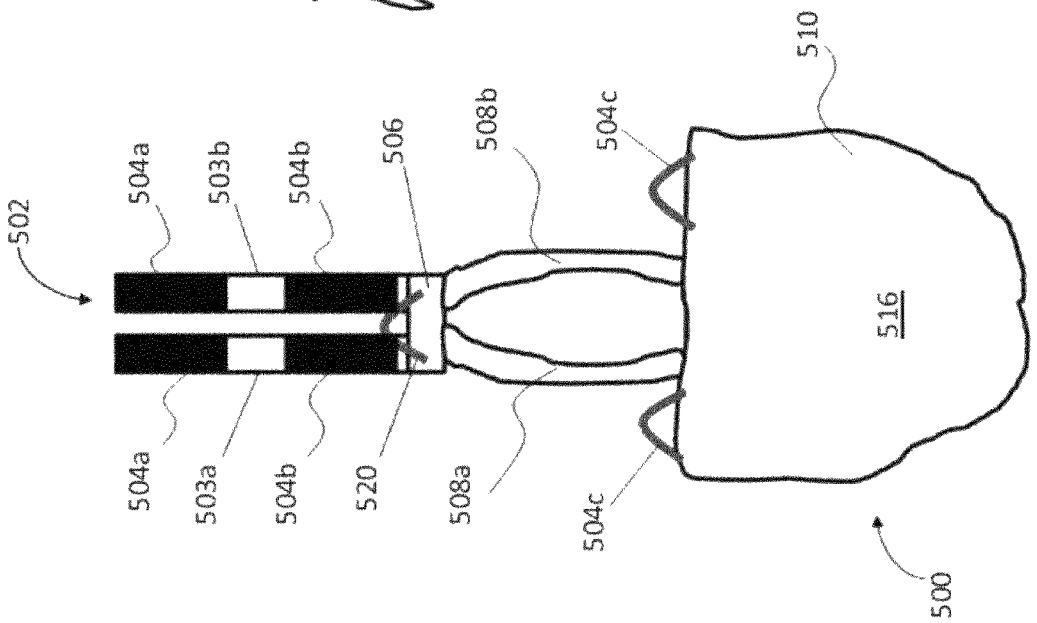
FIG. 5 is plan view of a harness-diaper assembly in accordance with yet another exemplary embodiment of the present invention in an open, laid-flat configuration.

FIG. 5 illustrates a harness-diaper assembly 500 in accordance with another exemplary embodiment of the present invention. The exemplary harness-diaper assembly 500 includes an upper-body portion 502, that is disposed along the bird's back 612 near its tail feathers when worn by a bird (FIG. 6). The upper body portion 502 includes a pair of first and second parts 504a, 504b of a corresponding pair of couple assemblies, which, in this exemplary embodiment, are each three-part couples 504a, 504b, 504c, that cooperatively releasably attach the harness-diaper assembly 500 to a bird. This coupling will be described in further detail below.

In this exemplary embodiment, a harness-securing portion 506 is attached to or part of the upper-body portion 502. The harness-securing portion 506 includes a leash-attachment anchor 520, which provides a mechanical coupling point for a leash or other tethering device to be attached to the harness-diaper assembly 500. The leash-attachment anchor 520 is similar to the leash-attachment anchors 120 and 320 of FIGS. 1 and 3, respectively, and, thus, can be comprised of any material disclosed above with respect thereto.

A pair of straps 508a, 508b is attached to the harness-securing portion 506 by an end of each individual strap 508a, 508b. In accordance with an exemplary embodiment of the present invention, the straps 508a, 508b are elastic, stretchable straps that can enlarge when securing the harness-diaper assembly 500 to a bird. So that the straps 508a, 508b are more comfortable to the bird, the straps 508a, 508b can be sleeved in any kind of material, such as cloth.

At their opposite end, the straps 508a, 508b are attached to the front-facing portion (not shown) of a waste receiver portion 510, which collects waste from the bird as it is excreted. The waste receiver portion 510 is similar to the waste receiver portions 110 and 310 described above, but does not include a notch. Although including a notch (similar to the notches 122 and 322 described above with respect to FIGS. 1 and 3, respectively) in the waste receiver portion 510 of the harness-diaper assembly 500 is within the scope of present invention, it would not provide the same advantages in the harness-diaper assembly 500 as it does for the earlier described harness-diaper assemblies 100 and 300. This is because the different coupling mechanism (504a, 504b, 504c) in the harness-diaper assembly 500 allows the waste receiver portion 510 to sit lower on the bird 501, as best illustrated in FIG. 6, thus, alleviating the need for a notch in the waste receiver portion 510. The interior surface of the waste receiver portion 510 defines a bowl-shaped waste-catching pouch formed by the rear-facing portion 516, the front-facing portion, and side walls connecting the rear-facing portion 516 to the front-facing portion. In FIG. 6, the wings of the bird are not illustrated for clarity.

As shown in FIG. 5, the rear-facing portion 516 of the waste receiver portion 510 has coupled thereto a pair of third parts 504c of the three-part couples 504a, 504b, 504c. In the particular embodiment shown in FIG. 5, the three-part couple 504a, 504b, 504c includes a D-ring 504c and hook and loop fastener (e.g., female VELCRO® fabric 504a and male VELCRO® fabric 504b), but the invention is in no way limited to the particular type of a couple. In other embodiments, the upper-body portion 502 is operable to couple to the waste receiver portion 510 with any of the fasteners mentioned above with respect to the embodiment of FIG. 1. In accordance with one exemplary embodiment, the portions 503a, 503b of the upper-body portion 502 disposed between the pairs of first and second parts 504a and 504b of the three-part couples 504a, 504b, 504c are elastic and can stretch and enlarge when securing the harness-diaper assembly 500 to the bird 501.

In accordance with exemplary embodiments of the present invention, a removable protective liner similar to the liner 200 described with respect to FIG. 2 is provided within the waste-catching pouch of the waste receiver portion 510, preferably without a notch.

As illustrated in FIG. 6, when attached to a bird 501, the harness-securing portion 506 of the harness-diaper assembly 500 rests on top of the main portion of the bird's back 612. At the front facing end of the harness-securing portion 506 are the straps 508a, 508b, which can be removably secured to the harness-securing portion 506 by snaps, buttons, hook and loop fasteners, sewing, and other fasteners. Attached to the rear-facing end of the harness-securing portion 506 is the upper-body portion 502, specifically, the pair of second parts 504b of the three-part couples 504a, 504b, 504c. Each of the first parts 504a of the upper-body portion 502 loops through each of the corresponding third parts 504c (of the three-part couples 504a, 504b, 504c) attached to the rear-facing portion 516 of the waste receiver portion 510 and attaches to each of the corresponding second parts 504b to releasably attach the harness-diaper assembly 500 to the bird 501.

To best illustrate how the pair of three-part couples 504a, 504b, 504c releasably attach the upper-body portion 502 to the waste receiver portion 510, FIG. 6 shows one three-part couple 504a, 504b, 504c (to the left in FIG. 6) in an already-attached position, with the first part 504a disposed atop and attached to the second part 504b (which is, therefore, not visible in FIG. 6). FIG. 6 shows the other three-part couple 504a, 504b, 504c (to the right in FIG. 6) with the first part 504a looped through the third part 504c, but not yet attached to the second part 504b. In this embodiment, the waste receiver portion 510 sits lower on the bird and the harness-diaper assembly 500 does not wrap about the tail feathers like the earlier disclosed harness-diaper assemblies 100 and 300. This is desirable to keep the bird's oil gland free. The harness-diaper assembly 500 may optionally include a stability strap similar to the stability strap 305 in FIG. 3 and, in such an embodiment, would connect strap 508a to strap 508b.

The present invention provides a novel waste-collecting harness-diaper for use on poultry. The diaper, advantageously, does not interfere with the bird in a way that inhibits the bird from participating in its normal activities. More specifically, the inventive diaper provides a depository directly below the bird's vent which does not interfere with the bird's ability to walk, sit, fly, lie down, or to engage in other routine activities. In addition, the inventive diaper is advantageously attached to the bird by an upper portion and a pair of shoulder straps that hold the diaper in place. In addition to securing the diaper to the bird, the upper portion provides an anchor for attachment of a leash that allows the bird to be tethered to its caretaker or to any desired location.

The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A diaper assembly for use on a bird, the diaper assembly comprising:
    an upper-body portion having at least one first part of at least one couple assembly attached thereto;
    at least one shoulder strap having a first end coupled to the upper-body portion and a second end opposite the first end;
    a waste receiver having a waste-catching pouch at least partially defined by:
        a front-facing portion coupled to the second end of the at least one shoulder strap; and
        a rear-facing portion having at least one second part of the at least one couple assembly,
    each second part of the at least one couple assembly releasably securing at least the rear-facing portion of the waste receiver to the upper-body portion, the upper-body portion being separate from the waste receiver prior to being releasably secured.

2. The diaper assembly according to claim 1, wherein the upper-body portion has a harness-securing portion.

3. The diaper assembly according to claim 2, further comprising a leash-attachment anchor coupled to the harness-securing portion.

4. The diaper assembly according to claim 1, wherein the waste receiver further comprises a protective liner at least partially within and removably coupled to the waste-catching pouch.

5. The diaper assembly according to claim 1, wherein the at least one couple assembly is at least one of:
    a hook and loop fastener;
    a snap fastener;
    a zipper; and
    a button and hole fastener.

6. The diaper assembly according to claim 1, wherein the at least one shoulder strap has a length and comprises a length of material having an elastic property along at least a portion of the length.

7. The diaper assembly according to claim 6, wherein the at least one shoulder strap comprises a sleeve of cloth material covering the length of material.

8. The diaper assembly according to claim 1, wherein the at least one couple assembly comprises at least one two-part couple including:
    the at least one first part of the upper-body portion; and
    the at least one second part of the waste receiver.

9. The diaper assembly according to claim 1, wherein the upper-body portion includes at least one third part of the at least one couple assembly.

10. The diaper assembly according to claim 9, wherein the at least one couple assembly comprises a pair of three-part couples, each three-part couple including:
    one of the at least one first part of the upper-body portion;
    one of the at least one second part of the waste receiver; and
    one of the at least one third part of the upper-body portion.

11. The diaper assembly according to claim 10, wherein:
    each second part includes a body member defining an aperture operable to receive therethrough each third part; and
    each third part is operable to attach to one of the first parts after being received through the aperture of the second part to releasably secure the rear-facing portion of the waste receiver to the upper-body portion.

12. The diaper assembly according to claim 9, wherein the upper-body portion comprises an elastic middle portion disposed between the first and third parts of the at least one couple assembly.

13. The diaper assembly according to claim 1, wherein the waste receiver comprises a notch formed in the rear-facing portion of the waste receiver.

14. A diaper assembly for a bird, the assembly comprising:
    an upper-body portion having at least one first part of a couple assembly attached thereto;
    at least one shoulder strap having a first end coupled to the upper-body portion and a second end opposite the first end; and
    a waste receiver having:
        a front-facing portion coupled to the second end of the at least one shoulder strap;
        a rear-facing portion having at least one second part of the couple assembly, the at least one second part releasably securing at least the rear-facing portion to the upper-body portion, the upper-body portion being separate from the waste receiver prior to being releasably secured; and
        a waste-catching pouch at least partially defined by the front-facing portion and the rear-facing portion.

* * * * *